May 13, 1952 A. W. PARKINS 2,596,821
ANTICHATTER FLOATING TOOLHOLDER
Filed March 18, 1949

Inventor
Albert W. Parkins
By Spencer, Willits, Helmig & Baillio
Attorneys

Patented May 13, 1952

2,596,821

UNITED STATES PATENT OFFICE 2,596,821

ANTICHATTER FLOATING TOOLHOLDER

Albert W. Parkins, Detroit, Mich., assignor to General Motors Corporation, Detroit, Mich., a corporation of Delaware Application March 18, 1949, Serial No. 82,205

10 Claims. (Cl. 279—16)

This invention relates to holders for "floating" reamers, taps, internal broaches, etc., and has as its principal object to provide an improved holder of this type featuring the effective elimination of tool chatter, together with relatively simple and inexpensive construction.

Heretofore, the use of reamers, etc. having carbide or other highly brittle cutting edges has been impractical in floating toolholders because of tooth chipping and breakage resulting from tool chatter. By eliminating this chatter, my holder enables carbide tools to be used with no greater danger of tooth breakage than is experienced with ordinary tools.

A preferred embodiment of my invention is illustrated in the drawing, wherein.

Figures 1, 2, 3, 4, 5:
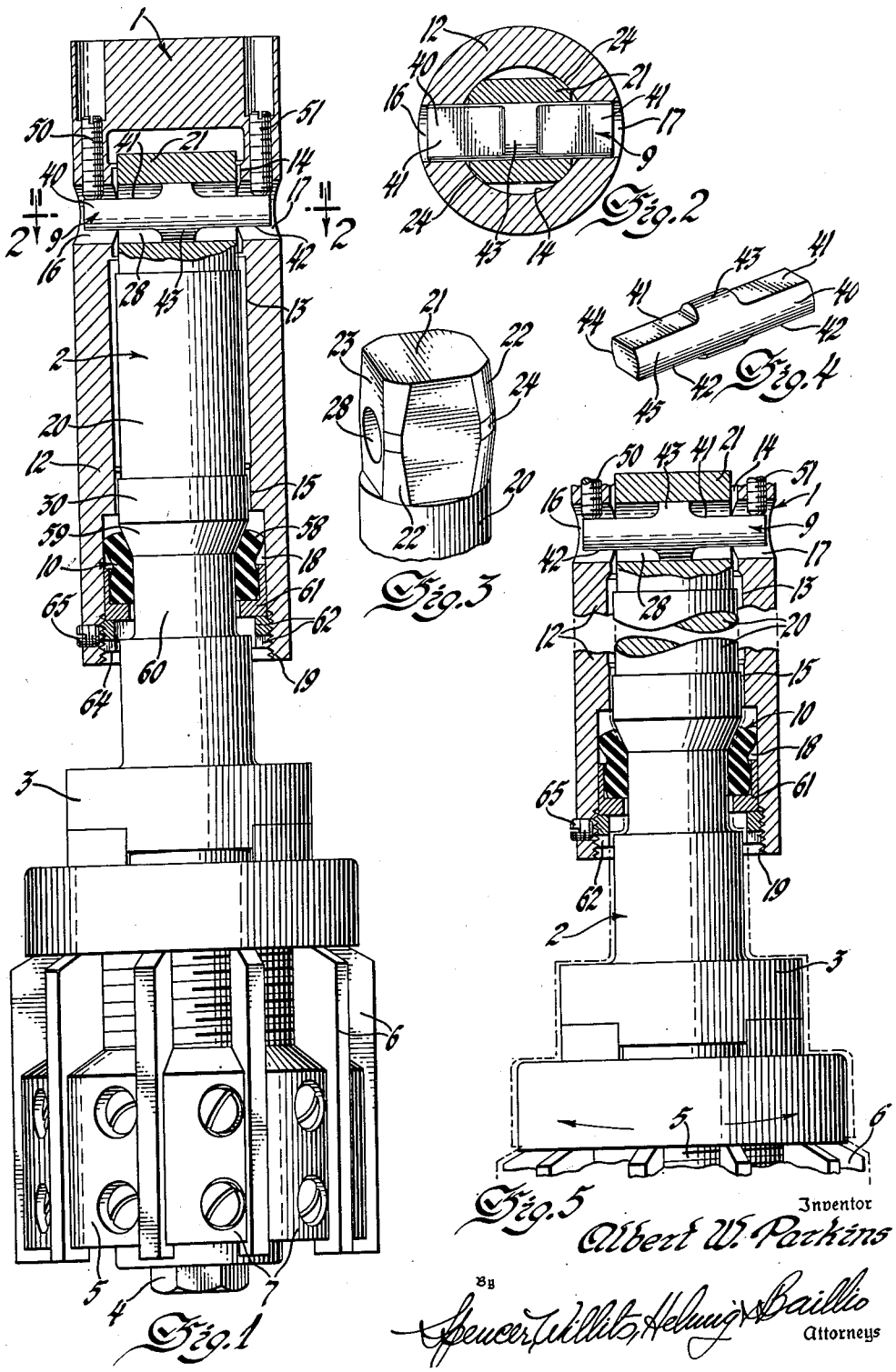
Figure 1 is a side view of my toolholder connected to an adjustable multi-blade carbide-tipped reamer of well-known form, certain parts of the holder being shown in longitudinal central section.
Figure 2 is a sectional elevational view taken on line 2—2 of Figure 1.
Figures 3 and 4 are perspective views showing detail features of construction of my toolholder.
Figure 5 is a fragmentary view similar to Figure 1, showing the normal positions of the parts in solid outlines and indicating other operative positions of certain parts in broken outlines.

Referring to the drawing, my toolholder comprises telescopically associated supporting and tool carrying arbor members indicated generally by numerals 1 and 2, respectively, the latter terminating in an end portion 3 adapted for attachment thereto as by a single bolt 4 of a rotary cutting tool such as the reamer indicated generally by the numeral 5. In the particular reamer shown there are a plurality of adjustable carbide-tipped blades 6 radially spaced from each other and secured by clamps 7. The construction of the reamer 5 does not form any part of the instant invention, it being understood that my toolholder is adapted for use with various types of reamers, internal broaches, taps, etc.

The telescopically associated members 1 and 2 are secured together by a connection indicated generally at 9 which permits the member 2 to tilt a limited amount relative to the member 1 but restrains them from all other relative movement. Axially displaced a substantial distance from the connection 9 is located an adjustable damping means 10 which biases the tool carrying member 2 into alignment with the supporting member 1.

The supporting member 1, which may be chucked or otherwise secured to a machine spindle (not shown), terminates at one end in a socket portion or sleeve 12. The inner wall 13 of sleeve 12 has two spaced apart reduced diameter sections or lands 14 and 15, and extending transversely through the wall of the sleeve at the innermost land 14 which forms part of the connection 9 are two aligned circular openings 16 and 17. Outwardly of the outermost land 15 the sleeve 12 is provided with a counterbore 18 which is threaded adjacent its outer end as shown at 19.

The tool carrying member 2 is provided with a shank 20 which extends longitudinally into the sleeve 12 and has a generally square section head 21 at the connection 9. This head 21 as shown in Figure 3 has relatively narrow corner faces 22 disposed obliquely to its side faces 23, and each corner face has a relatively short part-cylindrical portion 24 intermediate its ends from which the remainder of the corner face is tapered inwardly in opposite directions toward the longitudinal axis of the shank 20. The part-cylindrical portions 24 are in relatively close contact with the land 14 of the sleeve but by reason of their small area do not restrict rocking movements of the shank 20 within the limited range required in operation. The head 21 has a circular opening 28 extending transversely therethrough of the same diameter as the openings 16 and 17 in the sleeve 12. The remainder of the shank 20 is of smaller diameter than the internal diameter of the sleeve 12 to accommodate the rocking or pendant movement of the shank therein.

Completing the connection 9 between the members 1 and 2 is a cross pin 40 which extends through the opening 28 in the shank head and is supported at its ends in the sleeve openings 16 and 17. This pin 40, as perhaps best shown in Figure 4, is cylindrical in shape except for parallel reliefs or flats 41 and 42 disposed diametrically opposite each other adjacent each of its ends. Its cylindrical center portion 43, which is relatively short, and the unrelieved side portions 44 and 45 fit the cylindrical opening 28 in the shank head relatively closely so as to prevent any substantial movement between the latter and the pin about an axis perpendicular to the pin flats 41 and 42. In the assembly (Figures 1, 2 and 5) the pin is disposed with its flats perpendicular to the longitudinal axis of the sleeve 12 and is secured in that position as by set screws 50 and 51, which when run down tightly against the flats serve also to take up all clearance between the pin and the sleeve and to frictionally lock the pin against shifting transversely of the sleeve.

While the pin 40 thus prevents any relative axial rotation between the members 1 and 2, it accommodates swinging movements of the latter about the longitudinal axis of the pin, and by reason of the shortness of its cylindrical center portion 43 the pin also affords a limited degree of tilting movement of the shank about the pin's transverse axis which lies in the plane of the flats 41 and 42. The outermost land 15 in the sleeve, in conjunction with an increased diameter section or collar 30 opposite it on the shank 20, serves to limit tilting of the shank to the amount necessary for ample "floating" of the reamer 5 in operation, and prevents such movement in excess thereof as would result in binding of the head 21 with either the inner land 14 or the pin 40.

The adjustable damping means 10 includes an elastically deformable bushing 58 of rubber or equivalent material which is radially interposed between the counterbore 18 and the shank 20. Adjacent the innermost end of bushing 58 the shank 20 tapers inwardly at 59 from its collar 30 to a smaller cylindrical section 60 which has a sliding fit in the bore of the bushing. The outermost end and adjacent peripheral surface of the bushing is supported by an L-section ring 61 having a sliding fit in the counterbore 18. Adjustably supporting the ring 61 longitudinally within the counterbore is an externally threaded nut 62 on the sleeve threads 19. Spanner wrench slots 64 or the like are provided in the outer end face of the nut for effecting its rotation during adjustment and a set screw 65 is provided for locking the nut in its selected position. Running the nut 62 inwardly in the counterbore 18 causes the deformable bushing 58 to be wedged or compressed between the shank taper 59 and the counterbore.

The manner of operation of my toolholder is believed clear for the most part from the references thereto already made in the course of describing its structural elements and features, it being necessary only to point out that the adjustability of the compression of bushing 58 enables the holder to be readily tuned to obtain the correct amount of damping required to eliminate chatter of the particular cutting tool being used, and without necessitating the removal of the tool from the holder. In general, the amount of damping required to eliminate tool chatter increases with increase in tool diameter for the same rotating speed of the spindle or work. From Figure 5 it will be seen that my toolholder permits limited lateral shifting of the cutting tool 5, the mean position being indicated by solid outlines and its oppositely extreme positions by broken outlines, and that such shifting is resiliently resisted and dampened by the bushing 58.

I claim:

1. In a floating toolholder, a supporting sleeve, a shank having one of its ends loosely received in the sleeve and anchored against axial rotation therein, said sleeve having a counterbore spacedly embracing the shank, said shank having a tapered section opposite the counterbore, an elastically yieldable bushing radially spacing said tapered shank section from the counterbore, a ring axially supporting the bushing in the counterbore, and a nut threadedly engaging the sleeve for adjustably moving the ring axially of the counterbore to vary the compressive fit of the bushing between the counterbore and said tapered shank section.

2. In a floating toolholder, a supporting sleeve, a tool carrier having a shank extending longitudinally into the sleeve and provided adjacent its extended end with a generally square section head, said head having corner faces obliquely disposed to its side faces, each of said corner faces having its opposite end portions tapering inwardly toward the shank axis from an intermediate part-cylindrical portion concentric with said axis, said intermediate portions each being relatively small in area and in radial bearing relation with the adjacent inner surface of the sleeve, said head having a cylindrical opening extending transversely therethrough, a pin extending through said opening and fixed at its respective ends to the sleeve, said pin having a relatively short cylindrical portion intermediate its ends journaled in said opening and oppositely disposed parallel portions forming continuations with said cylindrical portion adjacent each side thereof, said parallel portions being laterally disposed from and symmetrical with the longitudinal axis of the sleeve, said pin having oppositely disposed parallel flat surfaces adjacent each side of said cylindrical portion, said flat surfaces being normal to the sleeve axis and providing relief from the otherwise cylindrical contour of the pin to accommodate limited rocking of the shank relative thereto in the plane of the pin and sleeve axes, and an elastically yieldable bushing for biasing the shank into alignment with the sleeve, said bushing being disposed between the shank and sleeve at a substantial distance axially from said pin.

3. In a floating toolholder, a supporting sleeve, a tool carrying arbor received in the sleeve and having a universal pivot connection thereto accommodating a limited degree of tilting of the arbor therein, said arbor and sleeve having oppositely disposed annular wall surfaces adjacent the entrance to the sleeve with one of said wall surfaces being tapered relative to the other, a bushing of soft rubber or equivalent material radially spacing said wall surfaces apart, and threaded means adjustable axially of the sleeve for wedging said bushing toward the large end of said tapered wall surface.

4. In a floating toolholder, an elongated supporting member, a tool carrying arbor telescopically associated with said member, said arbor having a connection to the member permitting universal pendant movement of the arbor and restraining all other movement of the same relative to said member, an elastically yieldable bushing radially spacing said member and arbor apart in opposition to said pendant movement, and means for adjustably compressing said bushing against said member and arbor to effect tuning of said pendant movement.

5. In a floating toolholder, an elongated supporting member, a tool carrying arbor telescopically associated with said member, said member and arbor having a connection accommodating tilting of the arbor relative to the member but restraining all other movement between them, a bushing of soft rubber-like material radially spacing said member and arbor apart at a substantial distance from said connection, and means for adjusting the compressive fit of said bushing between said member and arbor.

6. In a floating toolholder, a hollow supporting member, a tool carrying arbor extending into the member, a connection between the member and arbor preventing their relative rotation and longitudinal displacement but accommodating angular displacement between their longitudinal axes, and a bushing of soft rubber or equivalent material circumferentially spacing the arbor within the member at a section remote from said connection.

7. In a floating toolholder, a supporting sleeve, a tool carrying arbor received in the sleeve, a member anchoring the arbor rotatively and longitudinally to the sleeve but accommodating their angular misalignment, and a resilient member spaced longitudinally from the first of said member and operative to bias the arbor into alignment with the sleeve, said resilient member being operative against the arbor with equal capacity in all directions radially thereof.

8. In a floating toolholder, an elongated supporting member, a tool carrier having a shank telescopically associated with said member, a universal pivot connection between said member and carrier accommodating angular displacement of their respective longitudinal axes but restraining them from both relative axial rotation and longitudinal displacement, and a resilient element interposed between said member and shank at a substantial distance from said pivotal connection and effective to bias them into alignment with equal force in all radial directions.

9. In an anti-chatter floating toolholder for a rotary cutter, a supporting member having a sleeve portion open at one end, a tool carrying arbor extending longitudinally into the sleeve portion and having clearance for tilting movement therein, means preventing relative axial rotation of the arbor and sleeve portion but accommodating said tilting movement, and yieldable means axially remote from the first said means and effective equally in all transverse directions to resiliently restrain said tilting movement.

10. In an anti-chatter floating toolholder for reamers and the like, a rigid support member comprising a sleeve, a tool carrying member including a shank extending longitudinally within the sleeve and having limited tilting movement relative thereto, means preventing both axial rotation and longitudinal displacement of the shank and sleeve relative to each other while accommodating said relative tilting movement, and yieldable means resiliently restraining said tilting movement with equal force in all directions transverse to the axis of the sleeve.

ALBERT W. PARKINS.

REFERENCES CITED

The following references are of record in the file of this patent:

UNITED STATES PATENTS

| Number | Name | Date |
|---|---|---|
| 1,244,648 | Scheuman | Oct. 30, 1917 |
| 1,450,822 | Scheuman | Apr. 3, 1923 |
| 1,903,576 | Skeel et al. | Apr. 11, 1933 |
| 2,392,039 | Gideon | Jan. 1, 1946 |
| 2,404,866 | Scheuman | July 30, 1946 |
| 2,429,564 | Peterson | Oct. 21, 1947 |
| 2,460,210 | Barrett | Jan. 25, 1949 |
| 2,484,027 | Haffey | Oct. 11, 1949 |